A. B. DISS.
CASTER WHEEL.
APPLICATION FILED NOV. 23, 1914.
1,180,258.
Patented Apr. 18, 1916.
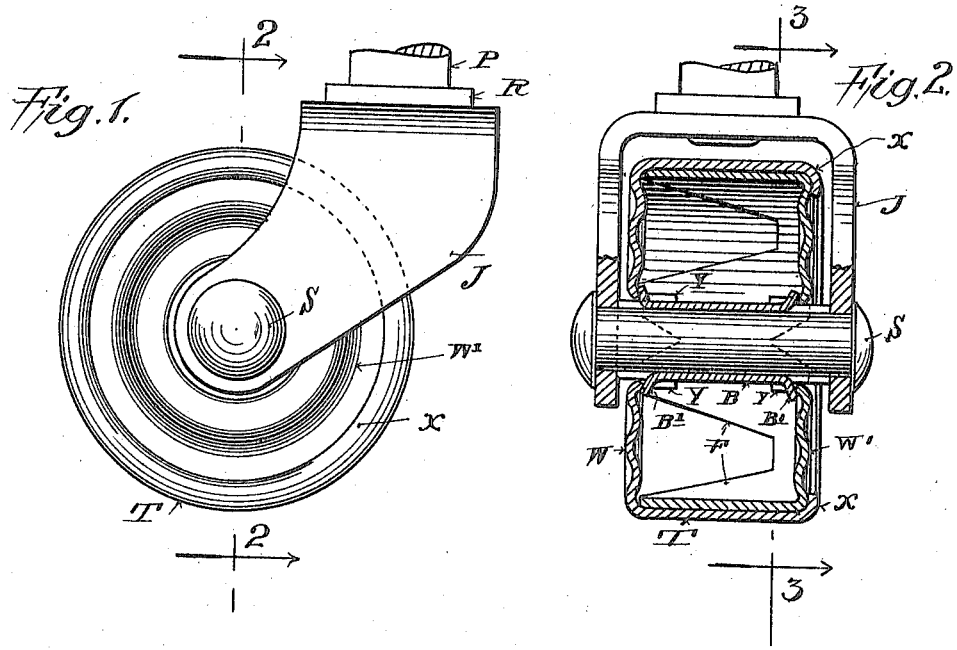
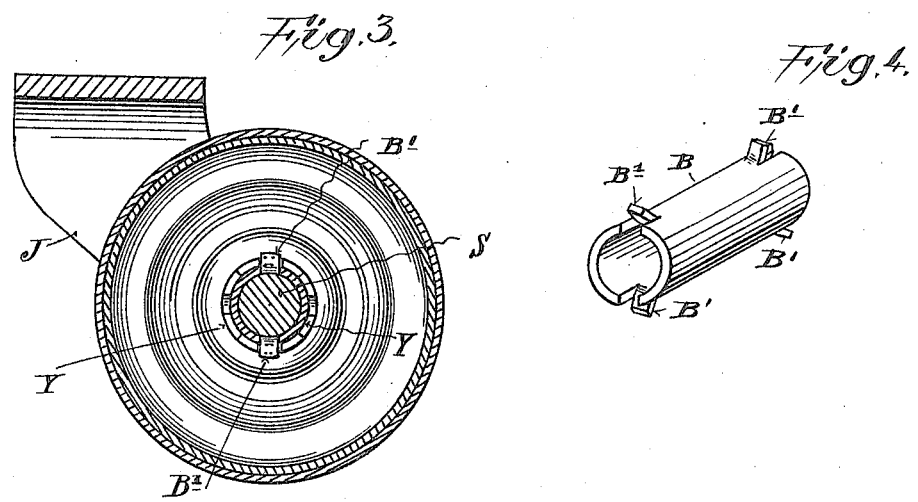

UNITED STATES PATENT OFFICE.

ALBERT B. DISS, OF NEWARK, NEW JERSEY.

CASTER-WHEEL.

1,180,258.

Specification of Letters Patent.

Patented Apr. 18, 1916.

Application filed November 23, 1914. Serial No. 873,523.

*To all whom it may concern:*

Be it known that I, ALBERT B. DISS, a citizen and resident of Newark, New Jersey, manufacturer, (whose post-office address is in care of Universal Caster & Foundry Company, at Newark, New Jersey,) have invented certain new and useful Improvements in Caster-Wheels for Furniture, of which the following is a description.

The improvement concerns particularly the caster wheel and its relation to the jaw or horn of the caster. It furnishes the best form of inexpensive and strong sheet metal wheel known to me.

The nature of the improvement will be readily understood by an immediate description of the best embodiment of it known to me, which is the one illustrated in the accompanying drawings.

Figure 1 is a side view of the caster-wheel, together with the horn and pintle, Fig. 2 is an axial cross-section of the same taken on line 2—2 of Fig. 1, Fig. 3 is a transverse section taken on line 3—3 of Fig. 2, and Fig. 4 is a detail view of a sleeve.

P is the pintle, here partly shown of a usual form, merely exemplary, as is also the washer R, jaw or horn J and shaft pin S. The wheel consists of outer and inner shells and a journal sleeve B which acts as a tubular strut under compression interposed between the shells. It is also the end or side-thrust bearing-member of the wheel. The outer shell comprises the cylindrical tread T and the web W and the central perforate portion of the web, which is inturned to stiffen it and which forms a collar fitting around the sleeve B and is secured by the inturned flange of the wheel tread, at X, as shown. The inturned portion forming the collar, is cut to form teeth or projections lying along the sleeve B as shown at Y. These constitute a clutch for locking the sleeve and the web against accidental rotation. The sleeve at each end has outturned ears B′ which form coöperating clutch members or dogs that enter between the teeth Y and press endwise against the interior of the web at the bottom or narrowest part of the space between the neighboring teeth Y. In principle one of the inturned members Y is sufficient to coöperate with the single dog B′ but preferably I employ two outturned ears or dogs B′ and four teeth Y so that in assembling, the dogs readily enter between the teeth without requiring the operator to feel around in assembling the parts rapidly.

The inner shell has a similar web W′ and collar comprising teeth Y′ held in the same manner and the peripheral portions lying within the tread are preferably cut to form a plurality of fingers or separated portions F the better closely and resiliently to bind and fit within the tread of the outer shell. It is made a snug fit and is forced tightly in place in the flanging over of the outer tread at X. The webs are annularly corrugated, as shown. This feature gives combined strength with a resilience axially at the collars, so that in upsetting the tread and flanging it at X to rivet the shells together, I am able to force inward the peripheries of the webs and so secure them against the dogs or teeth Y under strong stress and strain. By making the outside length of the sleeve B to fit the jaws, end bearings for the shaft are provided. In assembling the wheel, it is only necessary to place the parts together in their appropriate relation and then inturn, upset and so rivet over the flange X under sufficient pressure to insure a snug homing of the shells with each other and then if the distance between lugs B′ at opposite ends of the sleeve is of the preferred length the shells are slightly strained outward at the sleeve and the ends of the sleeve project slightly farther than any other part of the sides of the wheel. In this way the side or end-thrusts of the wheel and sleeve are borne directly on and by the ends of the sleeve acting against the inside face of the jaw.

Many variations from, and many additions to, the combination may be made without material departure from the form I have described and

What I claim is:—

1. In a caster wheel, the combination of an outer shell comprising a tread, a wheel web and an axial collar, an inner shell comprising one or more portions fitting within said tread, a wheel web and a collar in alinement with said first collar, a sleeve mounted within and connecting the collars to form a journal bearing member, said sleeve acting as a tubular strut having one or more portions which internally support the webs and projecting ends which form end-thrust bearings, adapted to contact the jaws of a horn in which a shaft journaled in said sleeve may be mounted, the said tread being flanged to secure the parts together, substantially as set forth.

2. In a caster wheel, the combination of an outer shell comprising a tread, a wheel web and an axial collar, an inner shell comprising a portion fitting within said tread, a wheel web and a collar in alinement with said first collar, and a sleeve mounted within and connecting the collars to form a journal bearing member, said collar having openings therein and said sleeve having portions extending through said openings and resiliently contacting the inner surfaces of said wheel webs, substantially as set forth.

3. In a caster wheel, the combination of an outer shell comprising a tread, a wheel web and an inturned axial collar formed with separated portions, an inner shell having an opposite wheel web and a collar in alinement with and similar to said first collar, and a sleeve mounted within said collars, having end portions projecting beyond said webs, and having outwardly bent ears extending between the separated portions of said collars into engagement with said wheel webs, said tread being flanged about the web of said inner shell to secure the parts together under resilient pressure, substantially as set forth.

In testimony whereof I have signed this specification in the presence of two subscribing witnesses.

ALBERT B. DISS.

Witnesses:
K. G. LEARD,
JOHN HERR.

Copies of this patent may be obtained for five cents each, by addressing the "Commissioner of Patents, Washington, D. C."